No. 853,900. PATENTED MAY 14, 1907.
A. M. SAUNDERS.
PIPE JOINT.
APPLICATION FILED JULY 26, 1906.
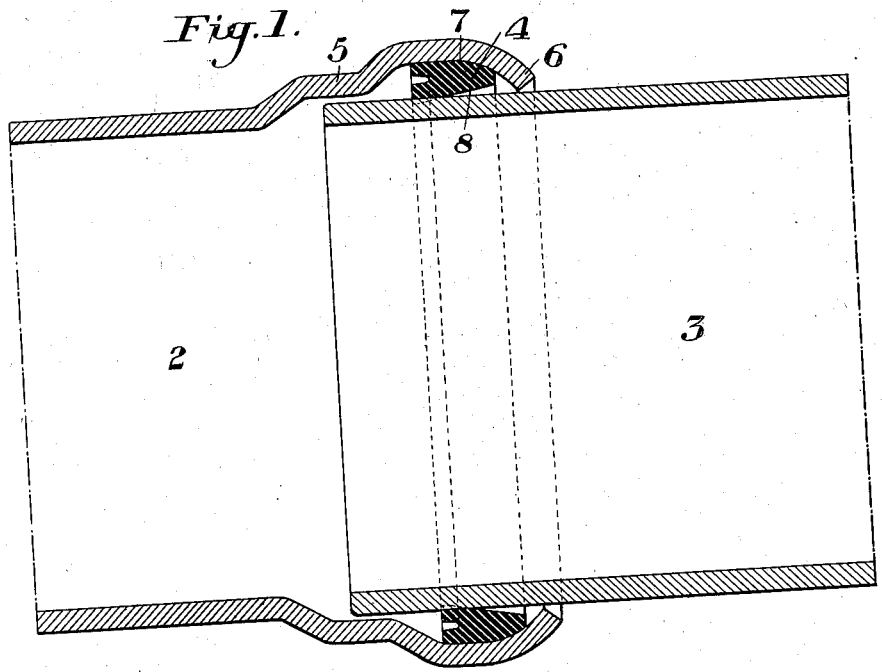
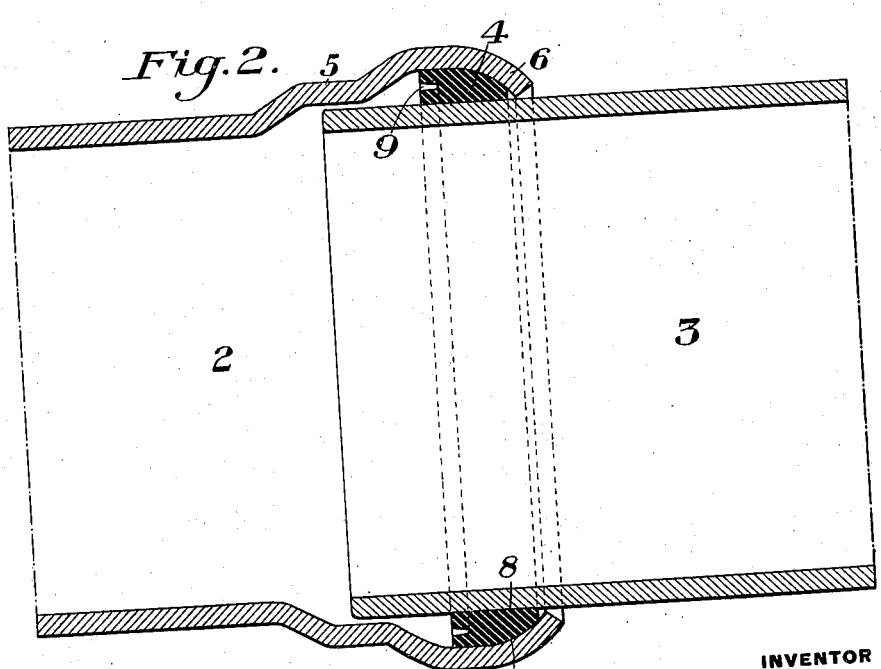

UNITED STATES PATENT OFFICE.

AUGUSTUS M. SAUNDERS, OF McKEESPORT, PENNSYLVANIA, ASSIGNOR TO NATIONAL TUBE COMPANY, OF PITTSBURG, PENNSYLVANIA, A CORPORATION OF NEW JERSEY.

PIPE-JOINT.

No. 853,900.

Specification of Letters Patent.

Patented May 14, 1907.

Application filed July 26, 1906. Serial No. 327,793.

*To all whom it may concern:*

Be it known that I, AUGUSTUS M. SAUNDERS, of McKeesport, Allegheny county, Pennsylvania, have invented a new and useful Improvement in Pipe-Joints, of which the following is a full, clear, and exact description, reference being had to the accompanying drawings, forming part of this specification, in which.—

Figure 1 is a longitudinal section showing the adjoining ends of two pipes as they are telescoped together one within the other, to form my improved pipe joint and Fig. 2 is a similar view showing the gasket in its position after being expanded in place by the action of the fluid pressure in the pipes. Fig. 3 is a sectional detail view on a larger scale of my improved gasket used in connection with the pipe joint.

Heretofore in pipe joints using a flexible gasket, difficulty has been experienced in inserting the one pipe within the other owing to the friction between the contacting surfaces of the pipes and of the gasket.

The object of my invention is to provide improved means by which the difficulties heretofore experienced in assembling the pipes where a flexible gasket is employed, are overcome and to provide means by which a tight joint is effected by the action of the pressure of the fluid contained in the pipes, and loss by leakage is prevented.

Another object of my invention is to provide an improved bell end for the end of wrought pipes by the use of which the necessity of the usual calked joint is avoided.

In the drawings 2 and 3 represent the ends of two adjoining pipes, the end of the pipe 2 being enlarged to form a bell of such size as to permit the end of the pipe 3 to be telescoped within it and forming the bell of such shape as to permit a flexible gasket 4 to be inserted between the surfaces of the two pipes. The bell on the pipe 2 consists of a cylindrical portion 5 of larger diameter than the main body of the pipe and a spherical portion 6. Preferably one end of each pipe is provided with a bell, the other end being the same size as the main body of the pipe. The gasket 4 is of peculiar cross section and as will be seen by reference to Fig. 3, the outer surface 7 of the gasket 4 is of substantially the same contour as the inner surface of the front end of the bell. The inner surface 8 of the gasket is tapered toward its outer end so as to make the thickness of the outer end less than that of its inner end The inner ends of the gaskets 4 are provided with a V-shaped groove 9, a line through the apex of the grooves being substantially parallel with the longitudinal axis of the pipes when the gaskets are assembled in place. The gaskets are preferably constructed of one piece so as to form an annular ring, although the gaskets may be cut from a strip of flexible material having its cross section such as is shown in Fig. 3 and of such lengths as are equal to the circumference of the pipe 3.

In assembling the pipes together to form the joints, the gasket 4 is inserted in place within the bell of the pipe 2. The end of the pipe 3 is then telescoped within the bell and the gasket. As will be seen by reference to Fig. 1, when the pipe 3 is being telescoped within the bell of the pipe 2, the gasket is in the rear end of the bell and by reason of the tapering inner portion of the gasket 4, the pipe 3 contacts only with the inner end of the gasket 4. Owing to the groove 9 in the rear end of the gasket 4, this portion of the gasket is very flexible and is compressed very easily. By tapering the gasket, the amount of its inner surface in contact with the surface of the inner pipe 3 is lessened, and by providing the V-shaped groove 9 in its rear end, the friction between the inner surface of the gasket and the surface of the pipe 3 is greatly reduced and the pipe can be easily placed in position within the bell of the pipe 2.

After the ends of the pipes have been assembled in place and fluid pressure is applied in the pipes, this pressure forces the gasket to the front end of the bell, into the position shown in Fig. 2. The gasket by contact with the converging surface of the outer end of the bell, is compressed so as to form a close contact between its surfaces and the meeting surfaces on the pipes 2 and 3. In this way, a tight joint is secured and leakage through the joints is prevented.

The advantages of my invention will be apparent to those skilled in the art. By the use of a tapering gasket the difficulties heretofore met with in inserting the pipes in joints where flexible gaskets are used are avoided. By the construction of the front end of the bell so as to lessen its diameter toward its outer end and by reason of the V-shaped groove in the rear of the gasket the gasket is forced into close contact with the pipes and is caused to form a tight joint, and the use of the usual socket and calked joints are rendered unnecessary.

Modifications in the construction and arrangement of the parts may be made within the scope of my invention. The gaskets, which are preferably made of rubber, may be made of any suitable flexible material and other variations may be made without departing from my invention.

I claim:—

1. A pipe joint consisting of a pipe having an integral enlarged end with a contracted mouth, a second pipe telescoped within the enlarged end and a flexible gasket around the telescoped portion of the pipe within the enlarged end, said gasket having an inwardly beveled face which is initially largely out of contact with the pipe and the enlarged end of said pipe having its wall inclined to act upon the outer side of said gasket and bring its inner surface into contact with the pipe under the action of the fluid pressure behind the gasket; substantially as described.

2. A pipe joint consisting of a pipe having an integral enlarged end with a contracted mouth, a second pipe telescoped within the enlarged end and an annular gasket of flexible material around the telescoped portion of the second pipe within the enlarged end of the first pipe, said gasket having a beveled inner face which is largely out of contact with the pipe while telescoping the pipe and which is brought into engagement with the telescoped pipe by the inclined wall of the enlarged end on the first pipe under the action of the fluid pressure behind the gasket; substantially as described.

3. A pipe joint consisting of a pipe having an integral enlarged end with a contracted mouth, a second pipe telescoped within the enlarged end and a flexible gasket around the telescoped portion of the second pipe within the enlarged end of the first pipe, said gasket having a beveled inner face which is initially largely out of contact with the pipe and having a grooved rear end, the gasket being arranged to be moved endwise and compressed under the action of the fluid pressure behind the gasket and bring its inner face into contact with the telescoped pipe; substantially as described.

In testimony whereof, I have hereunto set my hand.

AUGUSTUS M. SAUNDERS.

Witnesses:
RICHARD D. JAMES,
W. B. FELL.